June 13, 1961  P. S. MARTIN  2,987,976
CAMERAS
Filed March 30, 1956  2 Sheets-Sheet 1
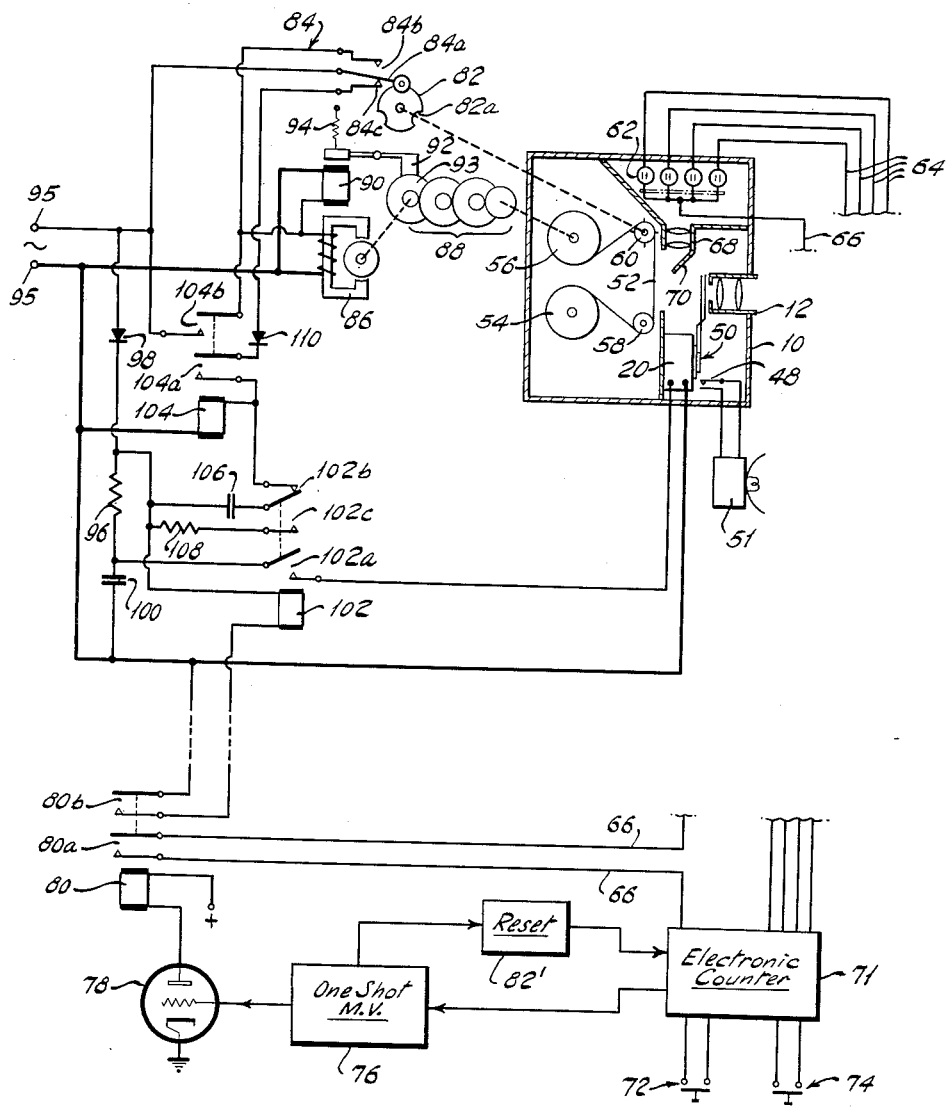
INVENTOR.
Paul S. Martin

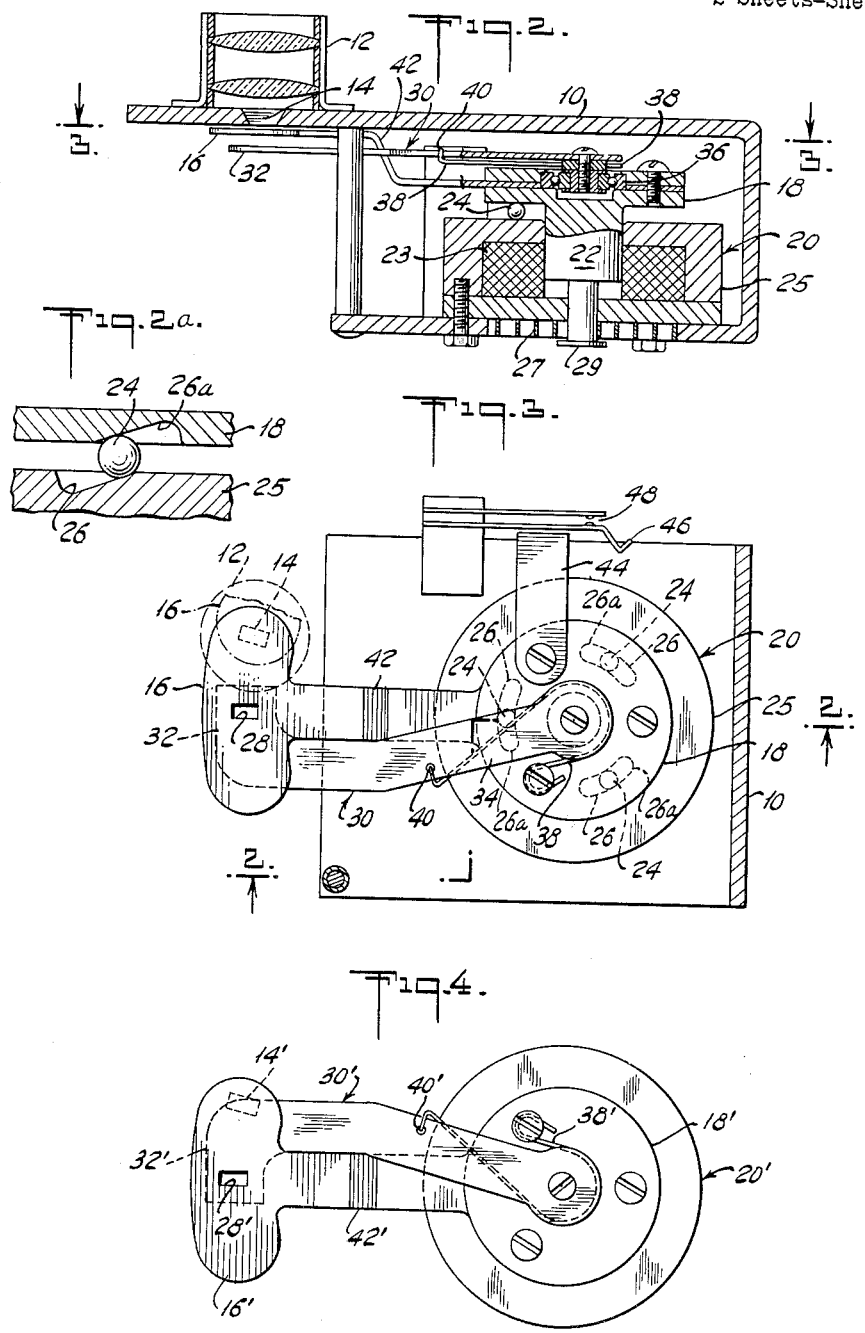

United States Patent Office 2,987,976
Patented June 13, 1961

2,987,976
CAMERAS
Paul S. Martin, 189—54 43rd Road, Flushing, N.Y.
Filed Mar. 30, 1956, Ser. No. 575,276
10 Claims. (Cl. 95—1.1)

The present invention relates to various features of novelty in cameras, particularly with respect to the shutter mechanisms, the film feeders, data recorders, and coordinating systems for these portions of the camera.

An object of the present invention is to make a fast exposure of an image or film and, on an adjacent film area, to make a slow exposure, where, for example, the "fast" image may be a stop-motion picture of a fast-moving object and where the slow exposure may be of data related to the "fast" image; and a further object of the invention is to coordinate an automatic film transport mechanism to advance a strip of film for a succeeding set of exposures.

A further object of the present invention is to provide a novel electrically operated from of shutter mechanism specially adapted to the purpose of making very fast exposures; for compatible operation in the above system of fast and slow image recording and film feeding; and for convenient electric shutter operation without resorting to elaborate reset or recocking operations.

A further object of the invention is to provide a novel film feeding mechanism for reliable single-step advance cycles; and especially for cordination of such film feeder with the exposure producing means of the camera in which the film feeder is used.

The nature of the invention and its various features of novelty will be thoroughly understood from the following description of illustrative apparatus embodying those novel features. That apparatus is shown in the accompanying drawings forming a part of this disclosure. In the drawings, FIG. 1 is a schematic of a complete camera and its coordinating and control system;

FIG. 2 is an elevation of a portion of camera 10 in FIG. 1 showing the shutter mechanism, this view being largely in cross-section, roughly parallel to the plane of the camera in FIG. 1;

FIG. 2a is an enlarged detail of the mechanism in FIG. 2;

FIG. 3 is a plan cross-sectional view of the apparatus along the line 3—3 in FIG. 2; and FIG. 4 is a plan view, similar to FIG. 3, of a modified shutter mechanism.

Referring first to the shutter mechanism of FIGS. 2, 2a and 3, a camera body 10 is shown bearing a lens assembly 12 arranged to project an image through a relatively small aperture 14 in the camera body. A shutter blade 16 bears resiliently against the flat inside surface of body 10 to close off this opening 14, light-tight. Shutter blade 16 is fixed to the top plate 18 of a "rotary" solenoid 20. Plate 18 is reciprocable vertically in FIG. 2 on a cylindrical ferrous armature 22, and oscillates arcuately about the axis of armature 22 by virtue of a series of ball bearings 24 and an equal number of short helical or slanting races 26 and 26a formed in the body of solenoid 20 and in the plate 18, respectively. When cylindrical member 22 is shifted downward axially by magnetic attraction, the downward stroke is converted into a brief twist of plate 18, thereby arcuately shifting blade 16.

Armature 22 is operated in a short downward stroke when winding 23 of solenoid 20 is energized. The iron housing 25 of the solenoid completes an efficient magnetic circuit, except for the air gap necessary for solenoid operation. A helical spring 27 is joined to a post 29 projecting from armature 22, and the other end of this spring is fixed to the shell 25 of solenoid 20. The tension of spring 27 is suitably adjustable.

Aperture 14 is shown in phantom lines in FIG. 3. Shutter blade 16 when at rest closes off aperture 14. The shutter blade has a hole 28 formed therein which is carried across aperture 14 during the oscillatory stroke of plate 18 and the armature 22. The hole 28 passes aperture 14 as blade 16 moves up in FIG. 3; and in the return stroke of blade 16, hole 28 again is momentarily aligned with aperture 14.

An auxiliary blade 30 has a portion 32 which is spaced below the free end of blade 16 and normally is in line with hole 28 in blade 16, when the mechanism is at rest. The support end 34 of auxiliary blade 30 is carried on a free pivot, here the inner race of ball bearing 36, supported on plate 18 of the rotary solenoid along the axis of armature 22. A relatively weak spring 38 is fixed at one end thereof to plate 18 and at point 40 spring 38 is fixed to auxiliary blade 30. This spring is arranged to bias the auxiliary blade clockwise. Normally blade 30 is biased into edgewise relation with portion 42 of blade 16.

Energization of solenoid 20 is in the form of an electric impulse which drives plate 18 very abruptly in an arcuate stroke, clockwise in FIG. 3, and plate 18 also moves downward through a short axial stroke. This has the effect of quickly advancing hole 28 into alignment with aperture 14 in the camera body 10, to make an exposure, and further advancing hole 28 beyond aperture 14. Spring 38 is relatively weak and the moment of inertia of auxiliary blade 30 is substantial. In relation to the time of the mechanical impulse of blade 16, auxiliary blade 30 has a natural slow period and lags behind the hole 28 as shutter blade 16 is moved as a rigid unit with plate 18. Shutter blade 16 completes it clockwise stroke, during which time auxiliary blade 30 commences its own clockwise stroke to catch up with blade 16. As blade 16 is arrested at the end of its clockwise stroke, and as it commences its return stroke under the influence of spring 27, the bias of spring 38 drives auxiliary blade 30 clockwise until blade 30 engages portion 42 of blade 16.

During the return stroke of blade 16, auxiliary blade 30 is carried with it as a unit, with portion 32 of the auxiliary blade in line with hole 28 of shutter blade 16. This arrangement prevents a double exposure from occurring during the return stroke of hole 28 past aperture 14. The natural period of the unit made up of spring 27 and the moments of inertia of parts 16, 18, 20, 22 and 36 is short; and the mechanical coupling of blade 30 through spring 38 is "soft." Consequently plate 16 that has direct drive from solenoid 20 advances ahead of plate 30 which is indirectly or resiliently coupled to this solenoid. The natural period of plate 30 and its spring 38 is short enough for portion 32 to cover hole 28 at some time after hole 28 passes aperture 14 the first time but before the return stroke. This operation, termed "capping," results from the described relative natural periods.

The shutter described is suitable for use with strobe or electronic flash lighting, and for this purpose the following synchronizing arrangement is provided.

Fixed to the plate 18 of the rotary solenoid 20 is a cam element 44 of insulating material, this being movable into engagement with a projecting portion 46 of a pair of synchronizing cam contacts 48. At the instant that hole 28 nears full alignment with aperture 14, contacts 48 close and trigger a stroboscopic light source. As hole 28 moves into line with hole 14 and therebeyond, the "strobe" lights up and is extinguished.

In FIG. 4 a modification of the shutter mechanism of FIG. 3 is shown, alternatively useful where the stroboscopic source of light is not required. Corresponding parts bear primed numbers. In this case the spring 38′ biases the auxiliary blade 30′ counterclockwise against the center portion 42′ of shutter blade 16′. The details of rotary solenoid 20′ need not be reviewed because they are the same in FIG. 4 as in FIGS. 2, 2a and 3. When blade 16′ is operated through an enforced clockwise stroke, the portion 32′ of the auxiliary blade remains fixed in relation to the moving blade 16′ to keep hole 28′ closed off.

When the two blades reach their clockwise limit, the solenoid and its stiff return spring and relatively small moments of inertia cause a quick return to normal position.

The inertia of auxiliary blade 30, and the relative softness of spring 38′ cause the auxiliary blade to lag behind. Accordingly it is apparent that hole 28′ will not be obscured by portion 32′ of the auxiliary blade 30′ during the return stroke of shutter blade 16′, and an exposure results.

The shutter mechanism of FIGS. 2 and 3, and the modification of FIG. 4, have numerous special advantages. With these mechanisms, extremely short exposure times are realized; and extremely durable and elementally simple shutter mechanisms are made available, advantages that are especially important where large numbers of fast exposures are to be made. Both forms of shutter mechanism are readily operated electrically, and neither requires any resetting in readiness for the next operation.

The shutter of FIG. 2 has the advantage of easy synchronization with "strobe" lighting, and further, the speed of the exposure can be high, depending on the energizing impulse. It may be noted in this connection that blade 16 of the FIG. 2 mechanism is not impeded by the inertia of blade 30 during the clockwise electrically-driven stroke, whereas blade 16′ must drive blade 30′ during the forward stroke. This indicates faster shutter-blade speeds are obtained when the "capping" blade lags the main shutter blade, that is, in those strokes when the exposure is made.

With the shutter mechanism of FIG. 2, an exposure time of 0.0005 second with a ⅛-inch wide shutter-blade opening 28 was readily attained. A strobe flash of 0.0002 second is easily synchronized with this open-shutter time. With this shutter the effect of daylight is minimized and moving objects can be photographed with no more apparent motion than that which occurs during the 0.0002 second strobe flash.

The shutter of FIG. 2 is included in the complete camera of FIG. 1, where the image from the lens is projected on a strip of film when the shutter is open.

Film 52 is taken from a supply reel 54 and delivered to a take-up reel 56. The film passes over a pair of idlers 58 and 60 which support the film at the focal plane. In FIG. 1, the shutter mechanism 50 operated by solenoid 20 is the same as in FIGS. 2, 2a and 3, including contacts 48 to operate strobe lighting unit 51.

A series of neon glow-discharge lamps 62 are shown in a data recording chamber within the camera body 10, these neon tubes having a series of individual wires 64 for energizing them and having a common return wire 66. The image of these neon tubes is projected via lens 68 and mirror 70 to the film at the focal plane, immediately adjacent the exposure produced by lens 12 and shutter mechanism 50.

No shutter mechanism is provided for the neon tubes because, as will appear, these neon tubes are "on" only during the making of a data exposure related to the respective images produced by lens 12 and shutter 50. Neon tubes 62 light up in a pattern, to indicate the count of an electronic counter 71, conveniently representing an elapsed period of time between a "start" and a "stop" operation of switches 72 and 74, where the counter itself contains a source of "clock" impulses. The pattern of lights is not actually "on" until the return circuit of wire 66 is completed, as is more fully described below.

When the "stop" impulse has been received, an impulse from the electronic counter 71 is fed to a one-shot multivibrator 76 and this in turn operates vacuum tube 78 to energize relay 80 during the period that the multivibrator is in its unstable condition. At the end of that period, relay 80 is de-energized. Also, at the end of that period, the multivibrator produces an impulse that is transmitted to the reset pulse generator 82′ for resetting the electronic counter to its initial-count condition.

Relay 80 operates contacts 80a which complete the return circuit 66 for all of the neon tubes 62 in the camera, only those neon tubes lighting up which are connected for energization through wires 64 to the appropriate portions of the electronic counter 71. Those neon tubes 62 which are "on" represent the count, and their image is recorded on the film without aid of a shutter. All the neon tubes 62 are normally "off" regardless of what the count may be, because contacts 80a are normally open.

The relay 80, contacts 80a, and the neon tubes 62 with their optical system 68 and 70 all produce what is herein referred to as a slow exposure in contrast to the fast exposure produced by lens 12 and shutter 50. The slow exposure may take 0.25 second, for example, a period established by adjustment of multivibrator 76.

It is of course necessary that the film shall remain stationary during the time of the slow exposure. For this purpose the film feeder in the apparatus of FIG. 1 has special coordinating controls.

Idler roll 60 of the film feeder is illustrated as having sprocket teeth for meshing with film having marginal performations. A cam 82 is locked to idler 60, this cam having a series of notches 82a. The movable operating arm 84a of a single-pole double-throw switch 84 is spring biased against cam 82, and drops into the depressions 82a of the cam during indexing of the cam. With the switch 84 in the condition illustrated, with arm 84a in a notch 82a, the film feeding mechanism is idle. This film feeder includes an electric motor 86, of the alternating-current self-starting induction type, with a reduction gear train 88 to take-up reel 56. A brake solenoid 90 is provided, having a brake shoe 92 biased by spring 94 to bear on the high-speed wheel 93 in the gear train 88.

When solenoid 90 is energized, shoe 92 is out of contact with the wheel 93 of the gear train, which is then free to feed film.

Solenoid 90 and the winding of motor 86 are connected electrically in parallel. They are energized through upper contacts 84b of switch 84 after the cam has shifted moving contact arm 84a out of one of the depressions 82a; the motor and brake have another energizing circuit for starting the feed cycle, to be described below. The motor operating circuit extends from alternating current energizing terminals 95, through holding cam-contacts 84b to the motor winding and the brake solenoid 90. So long as solenoid 90 is energized, brake shoe 92 is raised from wheel 93 and motor 86 is free to drive the gear train. When motor 86 and brake 90 are no longer energized, spring 94 presses brake shoe 92 against the high speed wheel 93 of the gear train. The tendency of the gear train to travel past the end of a feeding stroke is minimized in this way.

The start of a film-feeding cycle follows the "slow" exposure operation previously described. During the "slow" exposure time, the "fast" exposure also occurs.

An impulse power supply for the solenoid 20 of shutter mechanism 50 is energized by terminals 95. This includes a current limiting resistor 96, a rectifier 98 (which may be a small selenium rectifier) and a condenser 100. With 115 volts at terminals 95 a condenser of 8 microfarads works well, with a 200 ohm rotary solenoid, 16 microfarads being used in one illustrative application for fast, positive action. Further increase in capacitance contributes principally increased mechanical shock at the end of the power stroke, and may well be avoided. Resistor 96 prevents the current in solenoid 20 from being high enough (after discharge of the condenser) to operate the solenoid, against the bias of its return spring.

When a dual fast and slow exposure is to be made, relay 80 is energized and certain neon tubes 62 are illuminated. At the same time, contacts 80b of this relay are closed and energize a master control relay 102 for the camera. This relay closes contacts 102a and completes a direct circuit for discharging condenser 100 through solenoid 20 of shutter mechanism 50. Even if contacts 102a should remain closed for a long period (since relay 80 remains closed long enough for the exposure of neon tubes 62 to take place) the current provided through resistor 96 and rectifier 98 to solenoid 20 is inadequate to overcome the spring tension of return spring 27 of the rotary solenoid. After contacts 102a open, condenser 100 is recharged via resistor 96 and rectifier 98.

A holding device in the form of relay 104 is included in the film feeding control system. This relay 104 has one of its terminals connected to the A.C. line 95 directly, and it is coupled through contacts 102b and condenser 106 to the D.C. output side of rectifier 98. Accordingly in the at-rest condition, between exposures, condenser 106 is fully charged. No current flows through the condenser, and relay 104 is normally not energized.

Operation of relay 102 to energize shutter solenoid 20 closes contacts 102c so as to establish a circuit from charged condenser 106 through current-limiting contact-protecting resistor 108 for discharging the condenser during the time that the neon-tube exposure is made. When relay 80 is de-energized, contacts 80b open and relay 102 is also de-energized. Contacts 102b are then closed, and condenser 106 draws a sudden charging current to energize relay 104.

When relay 104 is energized even momentarily, contacts 104a close and complete a holding circuit for relay 104, from one side of the A.C. line 95, through relay 104, contacts 104a, through rectifier 110, cam-contacts 84c (which are closed so long as cam-switch-arm 84a is in a depression 82a) and to the opposite side of the alternating-current line. Relay 104 after being energized momentarily remains energized through its holding contacts until cam 82 lifts arm 84a out of a notch 82a.

Energization of the relay 104 also completes a circuit through contacts 104b to the motor and the brake solenoid for starting operation of the film feeder. Contacts 104b are in parallel with normally open cam contacts 84b, previously described. Closing of contacts 104b starts the motor cycle; and if contacts 84b close while contacts 104b are held closed with the relay 104 still energized by the charging current of condenser 106, a film-feed cycle takes place. However, even if condenser 106 is fully charged before cam 82 lifts switch arm 84a to close contacts 84b, relay 104 remains energized via contacts 84c, and motor-starting contacts 104b stay closed till motor-operating contacts 84b close. Thereafter the holding circuit for relay 104 (through cam contacts 84c) is broken and relay 104 drops out, in readiness for renewed operation by contacts 102b.

It has been considered that a cam-controlled holding circuit for relay 104 is unnecessary because the resistance and inductance of relay 104 and condenser 106 can constitute a time-constant holding circuit that will cause sufficient motor operation to rotate cam 82 and lift cam arm 84a, so that motor-operating contacts 84b will close. That operation is a broad feature of the present invention. However, if the film track should be tight or if the reel of film should be unduly heavy at some time, then the period provided for motor-starting by the particular time constant of condenser 106 and relay 104 may permit the motor to become de-energized before cam 82 has rotated sufficiently to close contacts 84b. Also the time constant may be made ample to take excess film loading into account, and in that event the "closed" period of contacts 104a may be so long that the feed might continue through multiple cycles, virtually continuously, during times when the film loading actually is light.

By providing a relatively short time-constant in a condenser 106 and relay 104, and by providing holding contacts 104a and the cam contacts 84c which are normally closed, highly reliable feeding occurs almost without regard to the load imposed by the film on the feeder. This also accommodates an extremely wide variation in the supply voltage at A.C. terminals 95. For example, successful feeding has occurred where 115 volts A.C. was the rated voltage of the motor and the brake solenoid, and the voltage under actual operating conditions was dropped to a mere 65 volts A.C.; and equally reliable single-step feeding was maintained with 135 volts A.C.

Certain features of the film feeding system here involved are disclosed, but not claimed, in Patent No. 2,730,937, issued January 17, 1956, in which the present applicant is one of the inventors named.

It is evident that the foregoing illustrative apparatus involves certain inventive features that are naturally susceptible to varied application and modification by those skilled in the art; and consequently the invention should be broadly construed in accordance with its full scope and spirit.

What I claim is:

1. In a camera, the combination of an electrical impulse operated shutter for making a fast exposure of a first image on a film, means for making a prolonged exposure on said film, and a film feeder for advancing the film stepwise to present fresh film areas for said exposures successively, control means for coordinating said shutter, said prolonged exposure means and said film feeder including a transient impulse generator, means to effect said exposures and to condition said impulse generator for generating an impulse, and means responsive to said impulse at the conclusion of said exposures to initiate operation of said film feeder, said film feeder including a motor having a cam, a double-throw cam-operated switch, and a holding device, said holding device when operated being effective to energize said motor, said double-throw switch in its normal at-rest condition being effective to maintain said holding means in condition to energize said motor, said transient impulse generator being effective to initiate operation of said holding device, and said cam being effective to close motor-energizing contacts of said cam-operated switch and to release said holding device.

2. In a camera, the combination of an electrical impulse operated shutter for making a fast exposure of a first image on a film, means for making a prolonged exposure on said film, and an electric-motor driven film feeder for advancing the film stepwise to present fresh film areas for said exposures successively, and control means for coordinating said shutter, said prolonged exposure means and said film feeder, said control means including a condenser, means simultaneously effective to actuate said exposure-making means and to condition said condenser during said prolonged exposure, to enable the condenser to draw momentary current subsequently, a relay, and means coordinated with said last-named means and effective at the conclusion of said exposures for connecting said condenser to said relay so that momentary current flows in the condenser to energize the relay temporarily, said relay having motor starting contacts for said film feeder, and self-operated one-step cam contacts for continuing motor operation and film feeding to complete a film feeding step.

3. In a camera, the combination of an electrical impulse operated shutter for making a fast exposure of a first image on a film, means for making a prolonged exposure on said film, and an electric motor-driven film feeder for advancing the film stepwise to present fresh film areas for said exposures successively, and control means for coordinating said shutter, said prolonged exposure means and said film feeder, said coordinating means including a relay, a condenser, means simultaneously operative to actuate said prolonged exposure making means and to condition the condenser to later draw displacement current to energize the relay, and means effective at the conclusion of the operation of said prolonged exposure-means to connect said condenser to said relay thereby to energize said relay momentarily for initiating operation of said film feeder, said relay having motor-starting contacts for said film feeder.

4. In a camera, the combination of an electrical impulse operated shutter for making a fast exposure of a first image on a film, means for making a prolonged exposure on said film, and an electric motor-driven film feeder for advancing the film stepwise to present fresh film areas for said exposures successively, and control means for coordinating said shutter, said prolonged exposure means and said film feeder, said coordinating means including a relay, a condenser, means operative during said prolonged exposure to condition the condenser to later draw displacement current to energize the relay, said relay having motor-starting contacts for said film feeder, said film-feeder having a set of normally closed holding cam contacts and a set of normally open step-operating cam contacts, connections between said relay and said normally closed contacts for maintaining relay energization after decay of the relay-energizing displacement current and until closing of said normally open step-operating cam contacts.

5. In a camera, an aperture plate having an aperture therein, a shutter for making an exposure via said aperture, said shutter having an impulse-energized actuating electromagnet, a main shutter blade oscillated thereby and an inertia-controlled capping blade cooperable therewith to allow an exposure to be made during only one but not both strokes of oscillation of said main shutter blade, means for making a prolonged data exposure including a data chamber within the camera, an internal lamp and control means for energizing the lamp for a time interval starting concurrently with energization of said shutter, and a film feeder having transient responsive means operative by said control means at the conclusion of said time interval to initiate one-step operation thereof, said film feeder including normally deenergized one-step-feed holding means, said transient-responsive means including a holding circuit for energizing said film feeder until said one-step-feed holding means has been energized and means effective concurrently with energization of said one-step-feed holding means for deenergizing said holding circuit.

6. In a camera, an electrical impulse operated shutter including an electromagnet for making a fast exposure of a first image on a film, means for making a prolonged exposure on said film, and a motor-driven film feeder for advancing the film stepwise to present fresh film areas for said exposures successively, and coordinating control means therefor including a first condenser 100 and a first pair of contacts 102a operable to dump the charge of said condenser into said shutter electromagnet, a second condenser 106 and a second pair of contacts 102c for discharging said second condenser, a relay 104 having holding contacts 104a and motor operating contacts 104b and including a winding, a third pair of contacts 102b effective when closed to connect said second condenser 106 to the winding of said relay 104, direct-current supply means 98 for said condenser and said relay winding to produce a momentary current impulse in said winding to operate said relay and thereby to close said relay holding contacts, said motor-driven film feeder including an electric motor 86, a film-driven idler roll 60, a cam 82 operated by said idler roll and a double-throw switch operated by said cam, said double-throw switch having one pair of contacts 84c that are closed at the completion of each film-feeding operation and remain closed until the next film-feeding operation is sufficiently under way for the cam to reverse the double-throw switch, said one pair of contacts 84c of the double-throw cam switch being connected to said relay holding contacts 104a to establish a relay holding circuit when said second condenser draws charging current to effect momentary operation of said relay, thereby to maintain relay energization until said idler roll has sufficiently operated said double-throw switch to reverse the contacts thereof, said relay holding circuit thereupon being broken to open said motor operating contacts of said relay, said double-throw switch also having motor-operating contacts 84b, and last-mentioned contacts being closed upon operation of said double-throw switch to break said relay-holding circuit so that the motor remains energized after deenergization of the relay and opening of the motor operating contacts of the relay and until the idler-operated cam restores the double-throw switch to its previous condition with said one pair of contacts 84a thereof closed, said coordinating control means further including means 78, 80, 80a, 80b, 102 for concurrently operating said prolonged exposure means and for maintaining said first pair of contacts 102a closed to connect the shutter electromagnet 20 to said first condenser 100 and for maintaining said second pair of contacts 102c closed in condition to discharge said second condenser charge thereby to condition it to subsequently carry charging current for operating said relay 104.

7. In a camera, a film feeder having electric drive means, electrically operable means for producing an exposure of prolonged duration on the film when stationary, a relay for energizing said electric drive means, a transient current-impulse generator normally quiescent and including a condenser normally connected to said relay in energizable relationship, and means effective to disconnect said impulse generator from said relay and to condition said condenser for subsequently producing a relay-energizing current impulse, means for simultaneously actuating said condenser-conditioning means and for energizing said exposure-producing means, and control means causing said last-named means to reconnect said condenser to said relay following each operation of the exposure-producing means thereby to energize said relay with an impulse and to initiate a feed operation.

8. A camera having exposure-producing means including a shutter and an operating solenoid therefor, and film feeding means, said film feeding means including a film feeder and an electric drive therefor, and a relay having normally open holding contacts and normally open control contacts, and an interrupter switch controlled by said electric drive and connected in series with said holding contacts and said relay to form a holding circuit, and said interrupter contacts being operable by said film feeder after predetermined operation thereof to open and break said holding circuit through said relay to open said control contacts, said control contacts being connected in series with the electric drive means, and coordinating means for said film feeding means and said shutter solenoid including contacts for controlling said solenoid and contacts for controlling said film feeding means, said coordinating means including means for closing said last-named contacts in consequence of the release of said solenoid actuating contacts.

9. A camera having a shutter and an operating solenoid therefor, a film feeder and an electric drive therefor, and coordinating means for said solenoid and said feeder drive, said coordinating means including a control relay having normally open holding contacts and normally open control contacts, a normally closed interrupter switch in series with said holding contacts and said relay to form a holding circuit, said interrupter contacts being operable by predetermined operation of said film feeder to open and break said holding circuit and thereby to release said control contacts to break the energizing circuit to the feeder electric drive through the control contacts of said relay, and control means including normally open contacts and normally closed contacts arranged to be switched away from their normal conditions and to be restored to normal coordinately with closing of the circuit for energizing said shutter solenoid and opening thereof, respectively, said normally open contacts when closed being arranged in a conditioning circuit for said control relay and said normally closed contacts, after being opened in coordination with said shutter solenoid operation, reclosing upon deenergization of said shutter solenoid to initiate operation of said feeder drive under control of said control relay.

10. In combination, a film-feeding mechanism for advancing a strip of film stepwise and electrically operated means for producing an exposure on the strip of film when the latter is at rest, said film feeding mechanism including an electric motor, motor-energizing cam contacts which close upon initiation of a feeding step to complete the feeding step and thereupon opening, means for initiating operation of said motor and thereby initiating feeding of the film and closing of the cam contacts, said operation initiating means including a relay having normally open motor operating contacts, a condenser and a single-pole double-throw set of contacts including contacts normally closed and arranged for connecting said condenser to said relay but said relay being deenergized under steady-state conditions for lack of displacement current in said condenser, and a circuit including further normally open contacts of said set of contacts closable for conditioning said condenser to draw displacement current, said normally closed contacts being arranged to open when said further contacts are closed, and said normally closed contacts being effective upon reclosing thereof after conditioning of said condenser to cause displacement current to flow in the relay and thereby to close said motor-operating contacts momentarily, and control means for said exposure-producing means and said set of contacts for simultaneously operating said exposure producing means and closing said condenser-conditioning contacts, said control means being operable to interrupt operation of the exposure-producing means and to effect reclosure of the normally closed contacts.

References Cited in the file of this patent

UNITED STATES PATENTS

| | | |
|---|---|---|
| 1,642,818 | Lessler | Sept. 20, 1927 |
| 2,125,388 | Monroe | Aug. 2, 1938 |
| 2,140,445 | Mihalyi | Dec. 13, 1938 |
| 2,166,440 | Jones | July 18, 1939 |
| 2,398,412 | Crumrine | Apr. 16, 1946 |
| 2,406,152 | Levine | Aug. 20, 1946 |
| 2,433,129 | Land | Dec. 23, 1947 |
| 2,533,800 | Hearn | Dec. 12, 1950 |
| 2,552,250 | Bonnemann | May 8, 1951 |
| 2,588,813 | Dube | Mar. 11, 1952 |
| 2,669,917 | Malone | Feb. 23, 1954 |
| 2,773,438 | Bretthauer | Dec. 11, 1956 |
| 2,795,175 | Foster | June 11, 1957 |
| 2,809,571 | Christensen | Oct. 15, 1957 |